US010385904B2

(12) United States Patent
Mag et al.

(10) Patent No.: US 10,385,904 B2
(45) Date of Patent: Aug. 20, 2019

(54) PRESS NUT DESIGNS TO MINIMIZE STACK THICKNESS

(71) Applicant: Apple Inc., Cupertino, CA (US)

(72) Inventors: Stefan C. Mag, San Francisco, CA (US); Miguel C. Christophy, San Francisco, CA (US); Daniel W. Jarvis, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 213 days.

(21) Appl. No.: 15/246,476

(22) Filed: Aug. 24, 2016

(65) Prior Publication Data
US 2016/0363154 A1 Dec. 15, 2016

Related U.S. Application Data

(63) Continuation of application No. 14/288,215, filed on May 27, 2014, now abandoned.

(51) Int. Cl.
| F16B 37/04 | (2006.01) |
| F16B 37/12 | (2006.01) |
| B23C 3/30 | (2006.01) |
| B23C 3/10 | (2006.01) |

(52) U.S. Cl.
CPC ............. F16B 37/048 (2013.01); B23C 3/30 (2013.01); F16B 37/122 (2013.01); B23C 3/10 (2013.01); B23C 2220/04 (2013.01); Y10T 29/49883 (2015.01)

(58) Field of Classification Search
CPC ..... F16B 37/068; F16B 37/122; F16B 37/048

USPC ............. 411/177, 180, 176, 181–183, 166
See application file for complete search history.

(56) References Cited

U.S. PATENT DOCUMENTS

| 2,255,649 | A | * | 9/1941 | Burke | ............. F16B 37/02 |
| | | | | | 411/176 |
| 2,304,107 | A | | 12/1942 | Leisure | |
| 3,969,011 | A | | 7/1976 | Yamada | |
| 4,099,274 | A | | 7/1978 | Emberson | |
| 4,167,648 | A | * | 9/1979 | Lockwood | ............. H02G 3/125 |
| | | | | | 174/53 |
| 4,741,582 | A | | 5/1988 | Peroni | |
| 4,974,377 | A | | 12/1990 | Dominitz et al. | |
| 5,065,490 | A | * | 11/1991 | Wivagg | ............. F16B 19/1081 |
| | | | | | 24/297 |
| 5,891,115 | A | * | 4/1999 | Hauer | ............. A63C 17/22 |
| | | | | | 301/111.01 |
| 6,027,372 | A | * | 2/2000 | Lai | ............. H01R 12/7047 |
| | | | | | 411/182 |

(Continued)

Primary Examiner — Flemming Saether
(74) Attorney, Agent, or Firm — Dickinson Wright RLLP (57) ABSTRACT

The described embodiments relate to embedding a threaded insert into a thin-walled housing. A recess can be formed with a machining tool that forms a recess in a thickened portion of the thin-walled housing. In some embodiments, the recess can be formed along one of the walls of the thin-walled housing in a location having highly a constrained amount of space available. Once the recess is formed a threaded insert can be pressed into the recess. An interference fit can be utilized to lodge the press-nut securely within the recess. Alternatively, a retaining member can be positioned across a front portion of the recess to trap the threaded insert between the retaining member and a rear surface of the recess.

10 Claims, 12 Drawing Sheets

(56) References Cited

U.S. PATENT DOCUMENTS

| | | | |
|---|---|---|---|
| 7,614,602 B2* | 11/2009 | Hutter, III | H02G 3/30 |
| | | | 248/694 |
| 7,921,539 B2 | 4/2011 | Woodall et al. | |
| 8,292,561 B2 | 10/2012 | Menon | |
| 8,998,548 B2 | 4/2015 | Kousens et al. | |
| 9,476,444 B2* | 10/2016 | Droste | F16B 37/122 |
| 2001/0005473 A1* | 6/2001 | Shiokawa | F16B 37/122 |
| | | | 411/339 |
| 2009/0155016 A1* | 6/2009 | Guo | F16B 37/122 |
| | | | 411/180 |
| 2013/0002103 A1* | 1/2013 | Peng | F16B 37/122 |
| | | | 312/223.1 |
| 2015/0023757 A1* | 1/2015 | Chang | F16B 37/048 |
| | | | 411/173 |
| 2015/0345534 A1* | 12/2015 | Mag | B23C 3/30 |
| | | | 411/427 |

\* cited by examiner

PRESS NUT DESIGNS TO MINIMIZE STACK THICKNESS

CROSS-REFERENCE TO RELATED APPLICATIONS

This application is a continuation of U.S. application Ser. No. 14/288,215 filed May 27, 2014, of the same title, the content of which is incorporated herein by reference in its entirety for all purposes.

FIELD

The described embodiments relate generally to means for securing components to a thin walled housing. More particularly, the present embodiments relate to methods and apparatus for forming a recess suitable for receiving a press nut that includes a threaded opening in a small form factor electronic device.

BACKGROUND

As electronic devices grow increasingly smaller, space available within a device housing that has a desirable external size and shape can be insufficient to accommodate requisite internal operational components. One way to increase available volume within the device without making the housing any bigger is to reduce a thickness of interior and/or exterior walls of the device housing. Unfortunately, when the walls of the device housing are reduced below a minimum threshold, forming attachment points for internal operational components can become problematic. For example, when the walls become too thin to define a threaded opening having a sufficient depth to retain a fastener this can leave only adhesive couplings, which may be insufficient to properly secure components within the housing. Furthermore, in some embodiments, small form factor device housings can have internal geometries such as closely spaced walls that prevent line of sight to enable formation of a standard screw point normal to an interior surface of the small form factor housing.

SUMMARY

This paper describes various embodiments that relate to forming an attachment point within a device housing.

An electronic device is disclosed. The electronic device includes at least the following: a housing, including a first wall and a second wall, the first wall adjacent to the second wall; a protrusion extending from the first wall and towards the second wall, the protrusion including a concave surface defining a recess; and a threaded insert trapped within the recess by a number of retaining members extending across the recess and in front of at least a portion of the threaded insert, wherein the threaded insert is configured to receive a threaded fastener for securing an internal component against the first wall.

A method for forming an attachment point in a thin-walled housing is disclosed. The method includes at least the following steps: positioning a machining tool between two adjacent walls of the thin-walled housing; forming a channel with the machining tool in a protrusion extending from an interior surface of one of the walls; forming a number of holes that extend through both a top portion and a bottom portion of the protrusion; inserting a threaded insert into the channel, the threaded insert including a plurality of flanges; and driving a shaft through each of the openings so that each of the flanges is trapped between one of the shafts and a back surface that defines the channel.

An attachment feature, including at least the following elements: a protrusion extending from an inside surface of a sidewall, the protrusion having an inward curving surface disposed along a front surface of the protrusion, the inward curving surface defining a recess; a threaded insert disposed within the recess; and a retaining feature that prevents removal of the threaded insert from the recess, the retaining feature disposed across a front opening leading into the recess.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

As smaller form factor devices become more common place, ways to fit numerous electrical components and/or sensors within the small form factor devices gets increasingly more challenging. One way to increase an amount of available room is to utilize a thin-walled device housing that provides the benefit of increased internal volume when compared with a device housing of similar size having thicker walls. Unfortunately, when particularly thin walls are used, formation of attachment or screw points in the thin walls can become challenging. For example, when engaging a threaded screw in a threaded opening, the threaded opening generally requires a minimum depth of threading that allows the threaded fastener to be securely engaged within the threaded opening. When the wall is not thick enough to support the minimum threading depth, coupling between the threaded screw and the threaded opening can be compromised.

One solution to this problem is to use a housing with walls that are selectively thickened in places where attachment points are desired. By forming attachment points only in the thickened portions of the walls of the housing, the wall thickness problems associated with attachment point formation can be overcome. In some embodiments, thickened portions of the walls can correspond to portions of the housing that would otherwise go unused or at least underutilized. In this way, the thickened walls can provide a material thickness suitable for supporting a threaded opening without adversely affecting space available within the housing. Another challenge of forming attachment points in small form factor housings is positioning a tool between adjacent walls to form the attachment points. The aforementioned targeted wall thickening can make positioning of the tool between adjacent walls even more difficult because the thickened walls can further reduce an amount of space between the walls. For example, when two walls are particularly close together forming an attachment point with conventional tooling can be problematic as the additional wall or any other internal blocking feature may not leave sufficient room to position the convention tool at an appropriate angle to form the attachment point. Conventional tooling often requires alignment of a shaft normal to an inside surface along which a threaded opening is desired to be formed. Some less conventional tools along the lines of T-cutters, and ball cutters can be used to form attachment points in minimal clearance areas because only the cutting portion of the blade needs to be oriented normal to a direction of the cut.

Unfortunately, the aforementioned tools are not well suited for forming a threaded aperture directly into a wall of the housing. Instead these tools can be utilized to form a recess in thickened portions of the housing. The recess can be shaped to receive a preformed press nut or threaded insert that can include threading to receive a threaded fastener. The threaded insert can be formed of a material that is harder than material used to form the wall of the housing. In this way, as the threaded insert is pressed into the housing the threaded insert deforms material of the housing so that the threaded insert becomes securely affixed within the recess. The recess can include geometry that discourages rotation of the threaded insert within the recess. In some embodiments, the threaded insert itself can include protruding features that dig into the material that defines the recess during an insertion operation. Once the threaded insert is inserted, the protruding features also act to discourage free rotation of the threaded insert within the recess. It should be noted that in some embodiments the threaded insert can be formed of a softer material than the housing and can be configured to deform around features defined by the housing.

These and other embodiments are discussed below with reference to FIGS. 1A-8; however, those skilled in the art will readily appreciate that the detailed description given herein with respect to these figures is for explanatory purposes only and should not be construed as limiting.

Figure 1A:
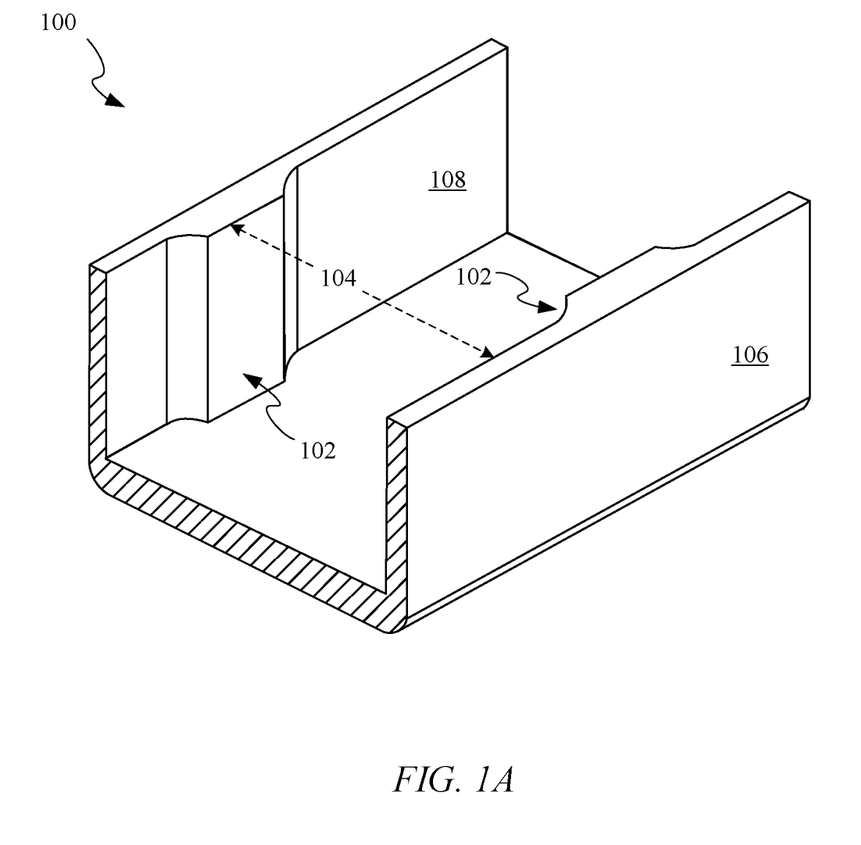
FIG. 1A shows a perspective view of a housing suitable for use with the described embodiments.

FIG. 1A shows a perspective view of a portion of housing 100. Housing 100 can include a number of protrusions 102. Protrusions 102 are securely joined with interior sidewalls of housing 100. In one embodiment, protrusions 102 can be formed during a subtractive machining operation. For example housing 100 can start as a single block of material from which material is machined away. By machining away a central portion of the block, a housing can be formed that defines a cavity within the single block of material. As the cavity is enlarged the walls of housing 100 become progressively thinner. Portions of the walls forming housing 100 can be purposefully left thicker where an attachment point is desired, thereby leaving protrusion 102. In this way, protrusions 102 can be integrally formed with the walls. Furthermore, a geometry of the protrusions can be easily customized by changing the machining operation during which material is removed. Alternatively, the walls can be formed having a uniform thickness and then protrusions 102 can be coupled to interior surfaces of the walls of housing 100. For example, protrusions 102 can be joined to housing 100 by a welding operation or by an adhesive coupling. Although only two protrusions 102 are depicted it should be understood that housing 100 can include any number of protrusions 102 having varying sizes and shapes. When a distance 104 between walls 106 and 108 is too small to position a machining tool, such as for example a drill, between walls 106 and 108 or drive the drill in a direction normal to an inside surface of protrusion 102, alternative machining tools can be utilized.

Figure 1B:
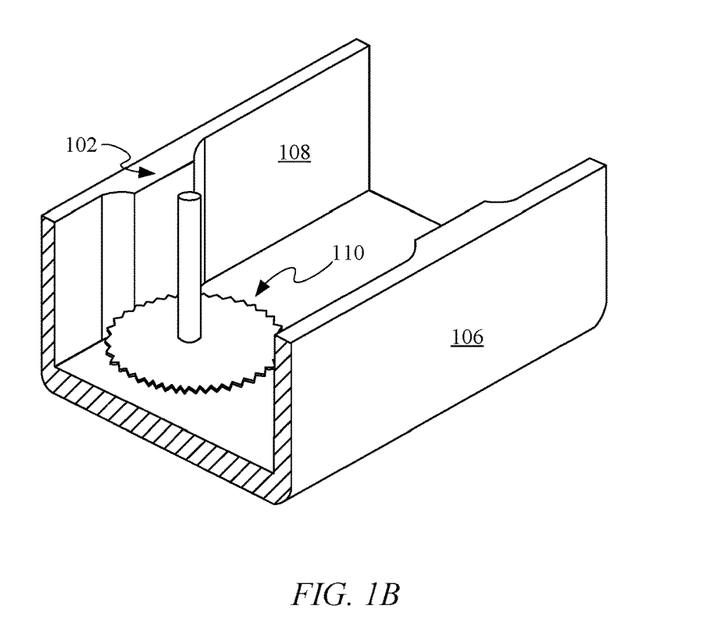
FIGS. 1B-1C show how a T-Cutter can be utilized to cut a substantially linear recesses into a protrusion of the housing depicted in FIG. 1A.
Figure 1C:
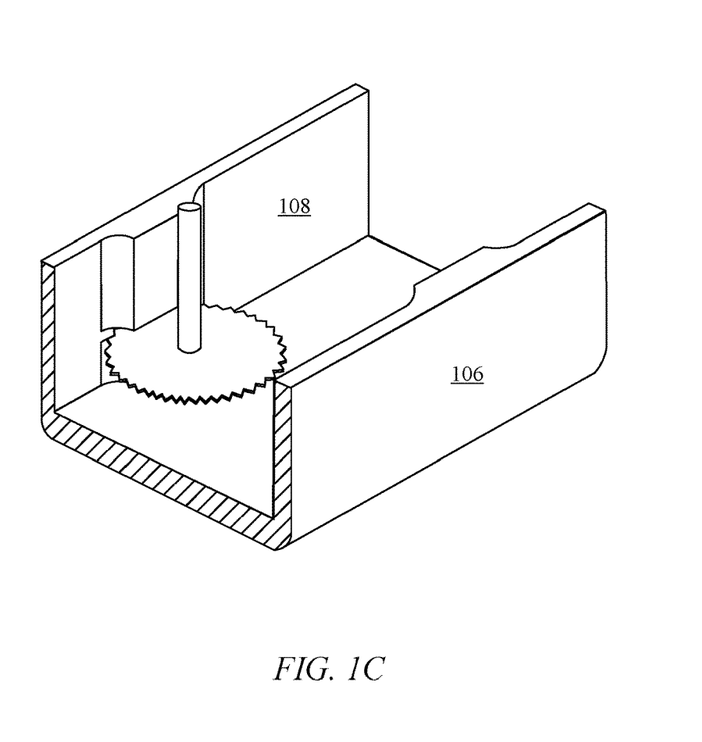

FIGS. 1B-1C show how a T-Cutter can be utilized to cut a substantially linear recesses into protrusion 102. FIG. 1B shows T-Cutter 110 positioned between walls 106 and 108 to prepare to engage at least one of protrusions 102. T-Cutter 110 can include a shaft rotatably coupled to a substantially circular cutting blade. It should be noted that in some alternative embodiments, a non-circular cutting blade having, for example an elliptical shape can be utilized. In some embodiments, the non-circular cutting blade can help to fit T-Cutter 110 between walls 106 and 108. While T-Cutter 110 is shown taking up a majority of space between walls 106 and 108, it should be understood that a cutting blade of T-Cutter 110 can have any diameter that is less than a distance 104 while maintaining a radius greater than a depth of a recess that is desired to be cut into protrusion 102. A size of the cutting blade can be sized to correspond with a desired curvature of a cut formed by the cutting blade. FIG. 1C shows a portion of a notch that can be formed by T-Cutter 110 as it cuts through a portion of protrusion 102. While a relatively narrow linear notch is depicted, it should be understood that a shape and width of the notch can be varied by maneuvering T-Cutter 110 in different directions during a cutting operation. In some embodiments, T-Cutter 110 can be translated back and forth at different elevations during a number of linear cutting operations to give the linear notch a desired geometry.

Figure 1D:
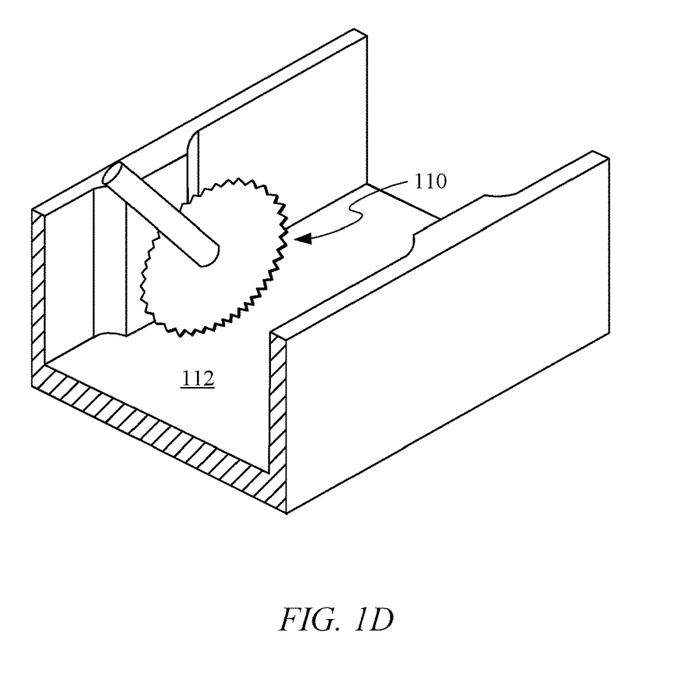
FIGS. 1D-1E show how a T-Cutter can be utilized to cut a cross-shaped recess into a protrusion of the housing depicted in FIG. 1A.
Figure 1E:
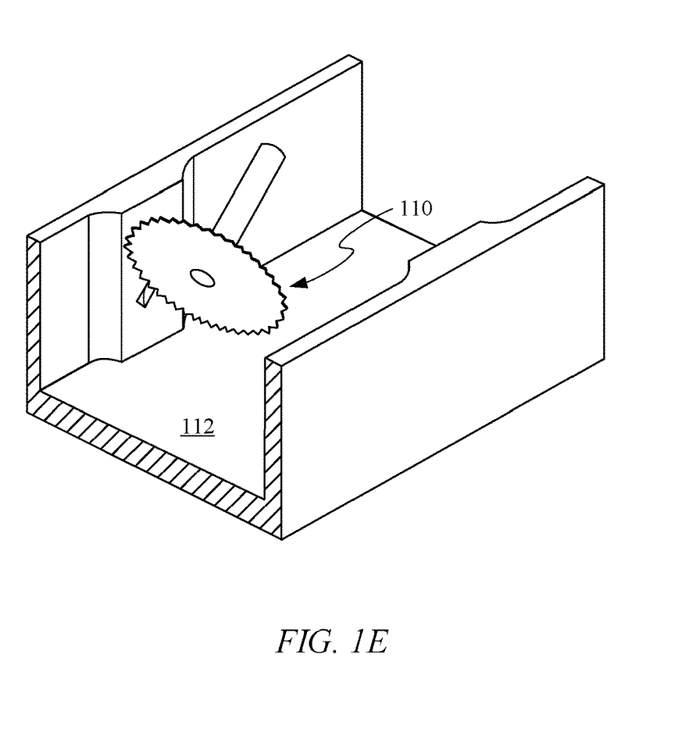

FIGS. 1D-1E show how a cross-shaped recess can be created by orienting T-Cutter 110 at a 45 degree angle with respect to housing base 112 of the housing prior to initiating a first cutting operation. Subsequent to the first cutting operation, T-Cutter 110 can be rotated 90 degrees from the orientation utilized in the first cutting operation prior to initiating a second cutting operation (see FIG. 1E). In other embodiments, instead of utilizing two discrete cutting operations T-Cutter 110 can be rotated between the two orientations depicted in FIGS. 1D and 1E during a single cutting operation to form a butterfly shaped recess, subsequently depicted in FIG. 5A.

Figure 2A:
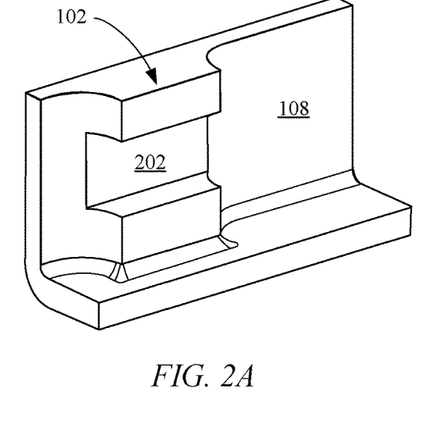
FIGS. 2A-2E show a recess that can be formed in accordance with the machining operations depicted in FIGS. 1B-1C and how a threaded insert can engage the formed recess.
Figure 2B:
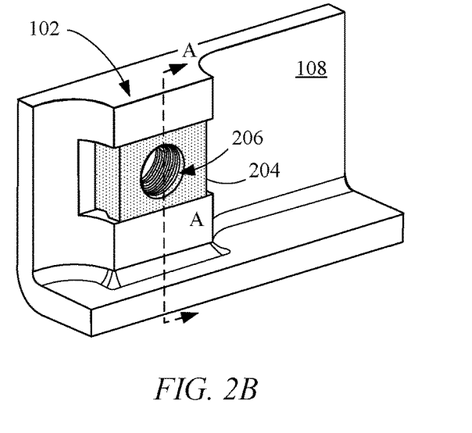
Figure 2C:
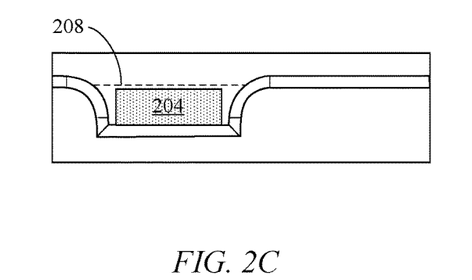
Figure 2D:
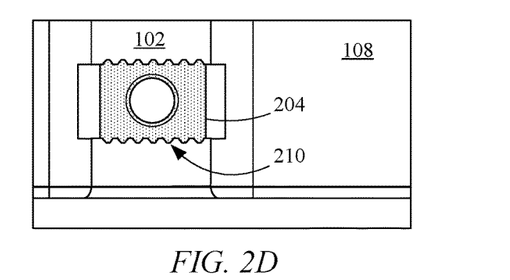
Figure 2E:
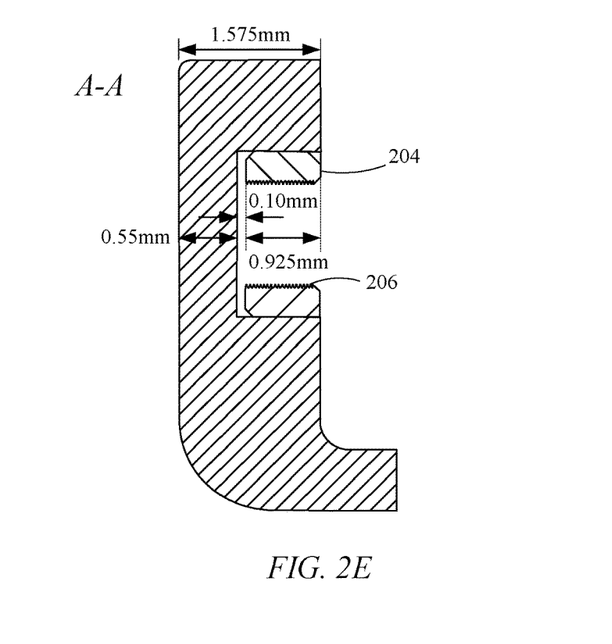

FIGS. 2A-2E show a recess that can be formed in accordance with the machining operations depicted in FIGS. 1B-1C and how a threaded insert can engage the formed recess. FIG. 2A depicts a perspective view of a housing having recess 202 machined into protrusion 102 in accordance with the discrete machining operation depicted in FIGS. 1B-1C. Depending on a height of a channel formed by recess 202, a number of machining operations can be utilized to create recess 202. FIG. 2B shows threaded insert 204 engaged within recess 202. Threaded insert 204 can be pressed directly into recess 202 until a front face of threaded insert 204 is substantially flush with a front face of protrusion 102. FIG. 2C shows a top view of protrusion 102 and threaded insert 204 that illustrates how far threaded insert 204 extends into recess 202 and how close threaded insert 204 comes to a back wall 208 that defines. As depicted, threaded insert 204 extends almost all the way into the thickness provided by protrusion 102. FIG. 2D shows a front view of threaded insert 204 and how threaded insert 204 can include a number of protruding features 210 that engage an interior surface defining recess 202. These protruding features 210 create grooves in walls that define recess 202 and can prevent least lateral shift of threaded insert 204 within recess 202. FIG. 2E shows a side cross-sectional view of threaded insert 204 in accordance with section line A-A of FIG. 2B. This depiction shows how threaded insert 204 extends nearly to the back of recess 202. In some embodiments, the gap between a rear surface of threaded insert 204 and back wall 208 can leave room for material deformed by threaded insert 204 during an insertion operation. In this way, threaded insert 204 can be fully inserted within recess 202. It should also be noted that recess 202 has a depth that leaves a remaining amount of material to structurally stabilize wall 108. In the depicted embodiment, wall 108 has a minimum thickness of about 0.55 mm. In some embodiments, this can be about the same as the rest of the wall, thereby preventing a weak structural area from coinciding with the attachment point. Depending upon design characteristics of the case the minimum thickness can be thicker or thinner.

Figure 3A:
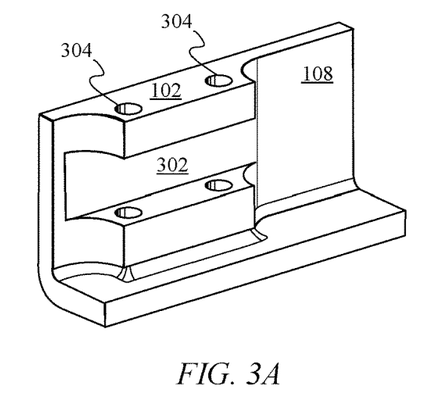
FIGS. 3A-3F show a specific configuration that can be created by utilizing a T-Cutter and a drill.
Figure 3B:
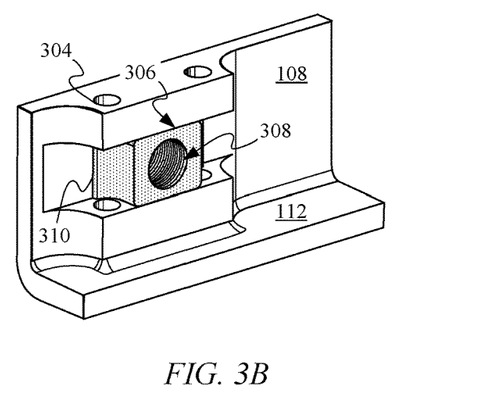
Figure 3C:
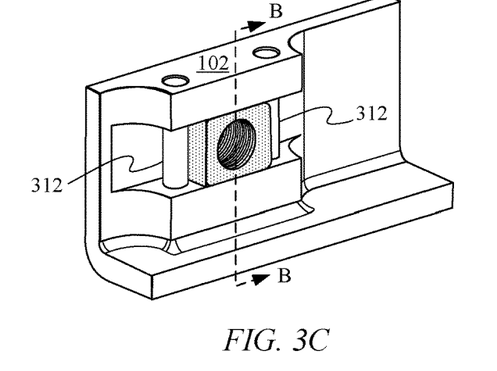
Figure 3D:
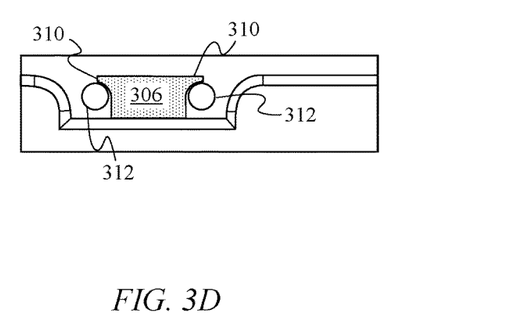
Figure 3E:
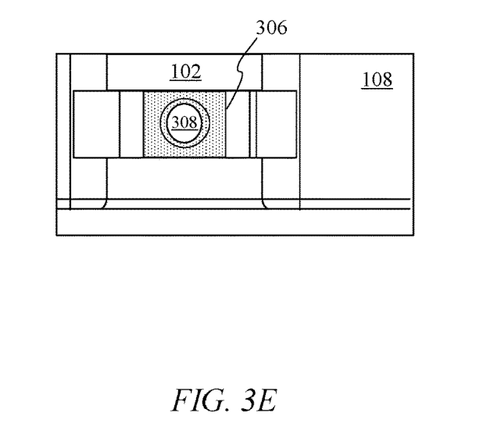
Figure 3F:
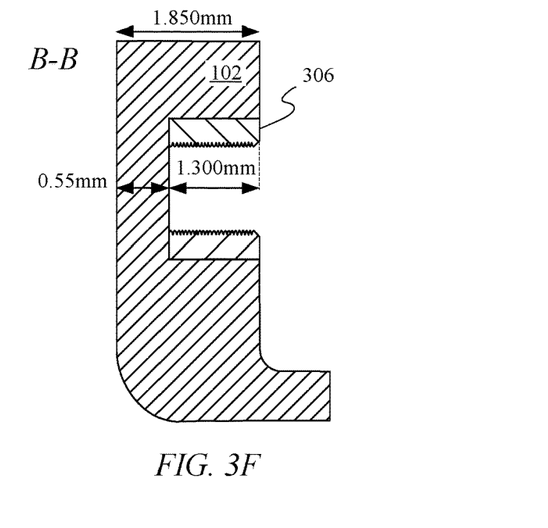

FIGS. 3A-3F show a specific configuration that can be created by utilizing a T-Cutter and a drill. Channel 302 can be created in accordance with the machining operations depicted in FIGS. 1B-1C. Subsequent to creating channel 302 a drill can be utilized to create openings 304 that extend through top and bottom portions of protrusion 102 to create the configuration depicted in FIG. 3A. In FIG. 3B a threaded insert 306 is pressed into channel 302. Threaded insert 306 includes threading 308 and flanges 310. Threaded insert 306 gets pressed into channel 302 until flanges 310 are pushed behind drilled openings 304. Flanges 310 can have a curvature shaped to interact with shafts 312 inserted through openings 304. FIG. 3C shows how shafts 323 can pass through openings 304 to trap threaded insert 306 within channel 302. Shafts 312 passing through openings 304 trap flanges 310 of threaded insert 306 between shafts 312 and a rear surface that defines channel 302. In some alternative embodiments, threaded insert 306 can include openings through which the shafts pass in lieu of flanges 310. In an embodiment, threaded insert can fill up substantially all of the volume of channel 302 made by the T-Cutter, and the shafts 312 can pass through the aforementioned openings in the threaded insert discussed above. By substantially filling channel 302 with threaded insert 306 a structural integrity of protrusion 102 can be about the same as it was before channel 302 was formed. FIG. 3D shows how flanges 310 can be trapped between a back wall of recess 302 and a portion of shafts 312. FIG. 3E shows how opening 308 can be disposed between and not covered by shafts 312. Finally, FIG. 3F shows how threaded insert 306 can be in direct contact with a back wall of recess 302. In this embodiment a wall thickness of 0.55 mm can provide thickness sufficient to maintain structural integrity of wall 108.

Figure 4A:
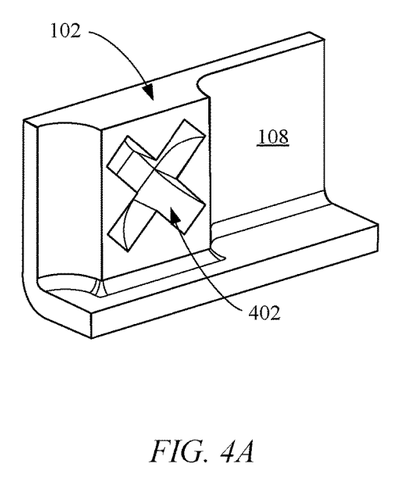
FIGS. 4A-4D show a specific configurations that can be created by utilizing a T-Cutter in accordance with the discrete machining operations depicted in FIGS. 1D-1E.
Figure 4B:
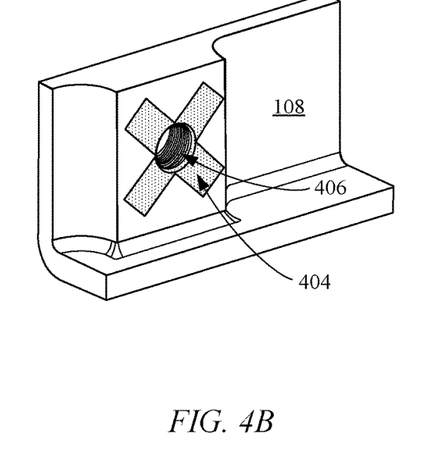

FIGS. 4A-4D show a specific configurations that can be created by utilizing a T-Cutter in accordance with the discrete machining operations depicted in FIGS. 1D-1E. FIG. 4A depicts a perspective view of an X-Insert configuration. Each leg of recess 202 has a variable depth with a curvature in accordance with a curvature of the blade of the T-Cutter used to form recess 402. While an X-Insert configuration is depicted, a cross-configuration is also possible by changing an angle at which the cutting blade of the T-Cutter contacts protrusion 102. FIG. 4B shows threaded insert 404 having a size and shape in accordance with recess 402. Threaded insert 404 may be made from a material that is harder than the material that forms protrusion 102. For example, threaded insert 404 can be formed from stainless steel when protrusion 102 is formed from aluminum or an aluminum alloy. Threaded insert 404 can be slightly larger in places than recess 402. In this way insert 404 can cause surfaces defining portions of recess 402 to deform around and retain threaded insert 404 with an interference fit. Threaded insert 404 can include threading 406 disposed in a central opening of insert 404. Threading 406 can have a pattern of threading that is complementary to a fastener it is configured to receive. In this way, the fastener and threading 406 can retain various components to which the fastener is mechanically coupled against wall 108 and/or protrusion 102.

Figure 4C:
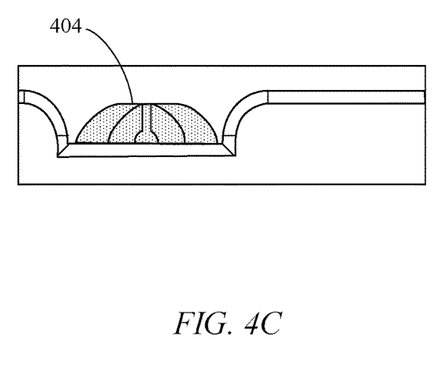
Figure 4D:
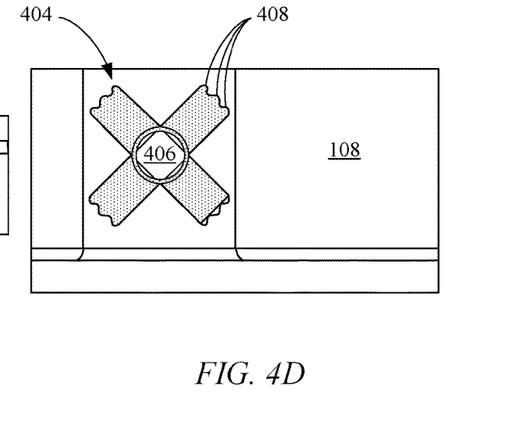

FIG. 4C shows a top view of threaded insert 204. The top view shows a position of threaded insert 404 with respect to protrusion 102. Individual legs of threaded insert 404 are depicted extending evenly from a central portion of threaded insert 404. FIG. 4D illustrates a front view of threaded insert 404. In this view protruding features 408 are depicted extending outward and away from a central portion of threaded insert 404. Protruding feature 408 can bite into surfaces that define recess 402 so that threaded insert 404 is secured within recess 402 at a periphery of threaded insert 404. In some embodiments, tips of protruding features 408 can be sharpened to reduce an amount of insertion force required as the sharply pointed protruding features 408 facilitate a greater concentration of force during an insertion event.

Figure 5A:
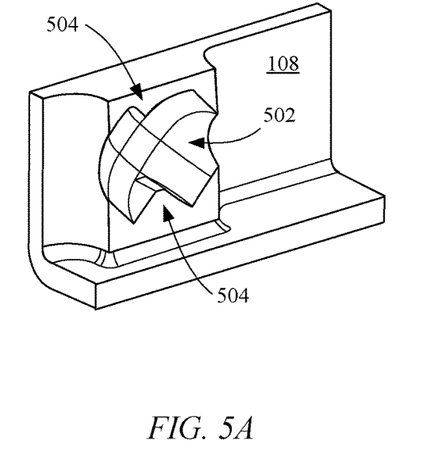
FIGS. 5A-5D show another specific configuration that can be created by utilizing a T-Cutter in accordance with the machining operations depicted in FIGS. 1D-1E.
Figure 5B:
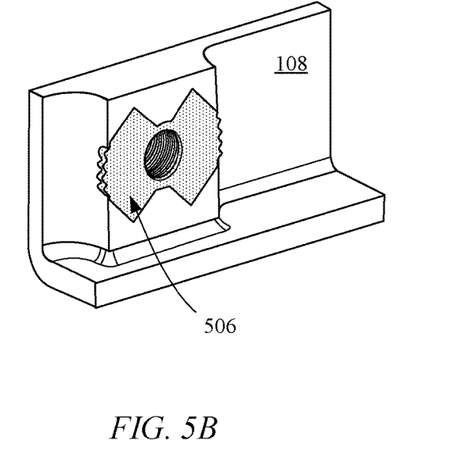

FIGS. 5A-5D show another specific configuration that can be created by utilizing a T-Cutter in accordance with the machining operations depicted in FIGS. 1D-1E. FIG. 5A depicts a perspective view of a recess 502 having a butterfly configuration created in accordance with a continuous machining operation in which the T-Cutter rotates about 90 degrees during a machining operation. In some embodiments, a greater or smaller angle of rotation can be used varying the angle in accordance with a shape of a threaded insert. It should be noted that by rotating the T-Cutter less than 180 degrees during the rotation two alignment features 504 can be left to prevent rotation of a threaded insert disposed within recess 502. It should be noted that recess 502 extends outside of protrusion 102, leaving a FIG. 5B shows threaded insert 506 engaged within recess 502. In some embodiments, threaded insert 506 can include engaging features configured to deform portions of a surface defining recess 502 so that threaded insert 506 can be securely disposed within recess 502.

Figure 5C:
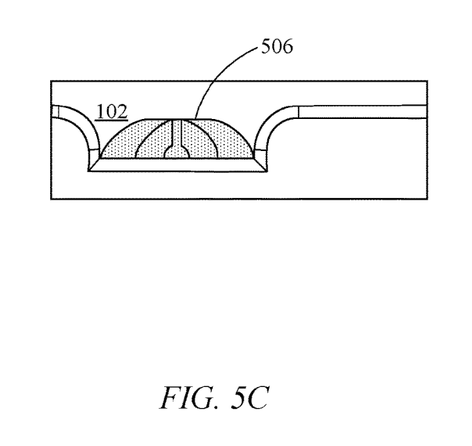
Figure 5D:
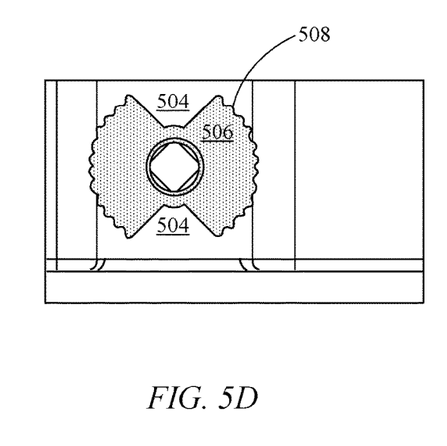

FIG. 5C shows how far threaded insert 506 extends into protrusion 102. The depth of threaded insert 506 generally depends on a depth of threading needed for threaded insert 506 to be securely coupled with a threaded fastener. An amount of threading required can depend upon a number of factors including a pitch of the threading, a diameter of the fastener and a material used to form threaded insert 506. In some embodiments the threading can pass entirely through the threaded insert while in other embodiments, the threaded insert can include a back wall that prevents a fastener from passing through the threaded insert. In other embodiments, the fastener can be configured to engage a portion of the wall 108 after passing through the threading of threaded insert 506. FIG. 5D illustrates how threaded insert 506 can include protruding features 508 that in cooperation with alignment features 504 inhibit free rotation of threaded insert 506 within recess 502. It should also be noted that threaded insert 506 includes protruding features 508 in locations that extend outside of protrusion 102. This can be useful when protrusion have varying widths. For example, when the butterfly configuration is disposed entirely within protrusion 102, each of protruding features 508 can bite into surfaces defining recess 502.

Figure 6A:
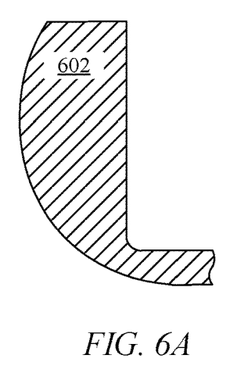
FIGS. 6A-6E show another method for forming a recess in a wall of a housing with an end mill.
Figure 6B:
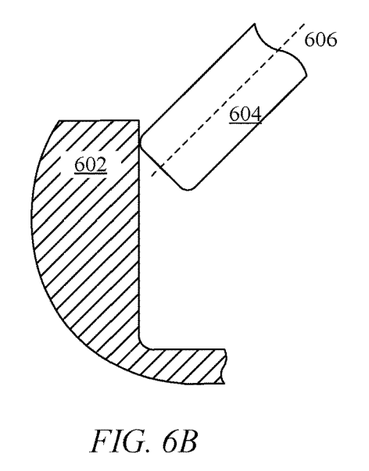
Figure 6C:
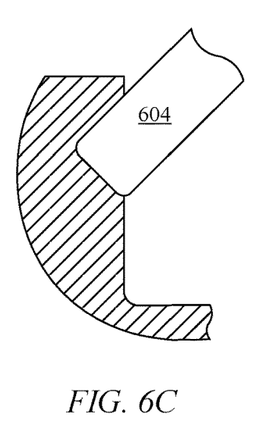
Figure 6D:
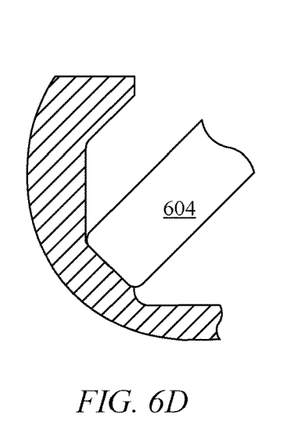
Figure 6E:
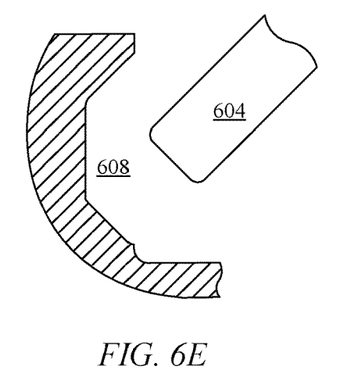

FIGS. 6A-6E show another method for forming a recess in a wall of a housing. FIG. 6A depicts sidewall 602 with a flat interior surface. End mill 604 is depicted in FIG. 6B just prior to engaging the wall of the housing. End mill 604 rotates about an axis of rotation defined by axis 606. In some embodiments, end mill 604 can be oriented at an angle of about 45 degrees with respect to the inside surface of the housing. FIG. 6C shows how end mill 604 is inserted a fixed distance into the surface of the housing. In FIG. 6D end mill 604 is translated straight down so that a rear surface having a substantial constant shape is created. This creates a consistent shape against which a threaded insert can be pressed. Finally, in FIG. 6E end mill 604 is depicted being extracted from formed recess 608. As can be seen in the figures, a 45 degree insertion angle has a benefit of providing top and bottom edges having substantially the same angle. Alternatively, different insertion and extraction angles can be utilized to provide differing angles for top and bottom portions of recess 608.

Figure 6F:
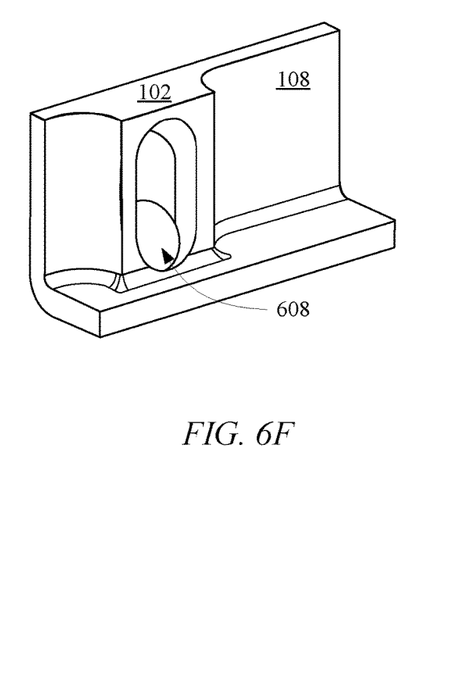
FIGS. 6F-6I show how a threaded insert can be engaged within a recess formed in accordance with the machining operation depicted in FIGS. 6A-6E.
Figures 6G, 6I:
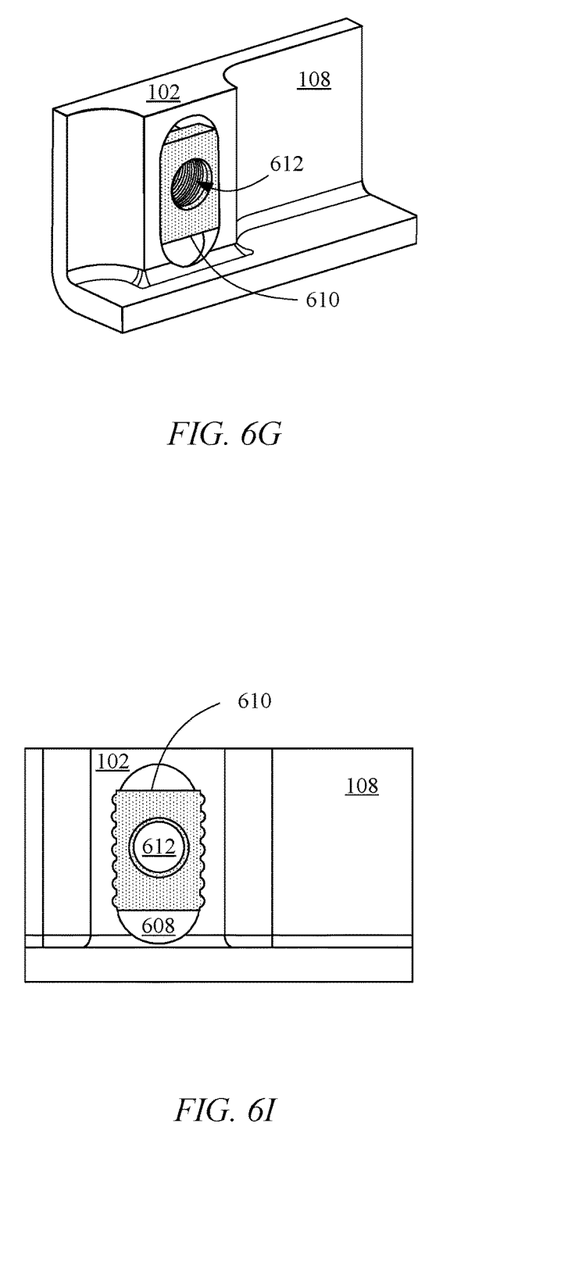
Figure 6H:
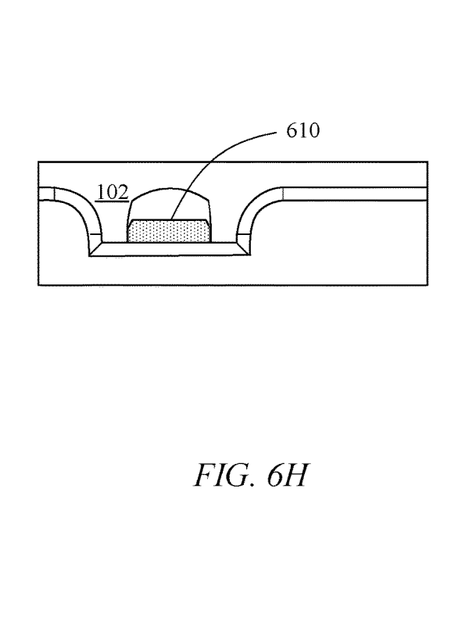

FIGS. 6F-6I show how a threaded insert can be engaged within recess 608. FIG. 6F shows a perspective view of recess 608 formed in accordance with the machining operation depicted in FIGS. 6A-6E. FIG. 6G shows how threaded insert 610 can be inserted into recess 608. Threaded insert 610 can have a geometry in accordance with a back surface of recess 608 as depicted or in other embodiments can have a shape and size in accordance with all of recess 608 so that threaded insert fills substantially fills recess 608. Threaded insert 610 includes threading 612 for retaining a threaded fastener. In some embodiments, threaded insert 610 can have a height that leaves upper and lower portions of recess 608 open. When threaded insert 610 has a that allows it to avoid the sloped surfaces created by insertion and extraction of the end mill, machining tolerances can be reduced as an angle of the insertion and extraction of the end mill need not be exact to facilitate proper fit of threaded insert 610 within recess 608.

Figure 7A:
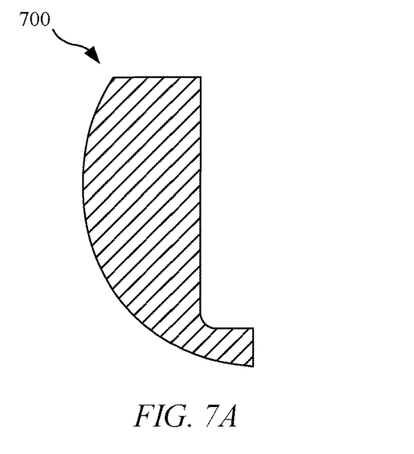
FIGS. 7A-7E show yet another method for forming a recess in a wall of a housing with a ball cutter.
Figure 7B:
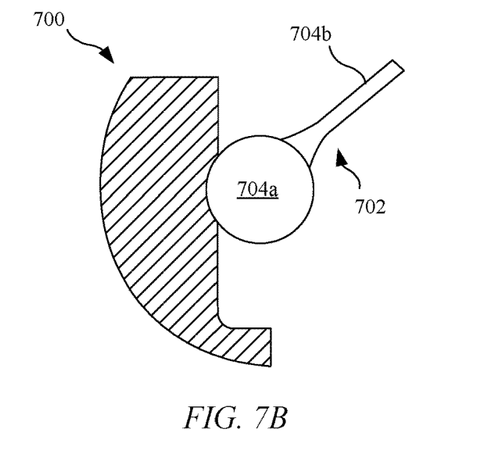
Figure 7C:
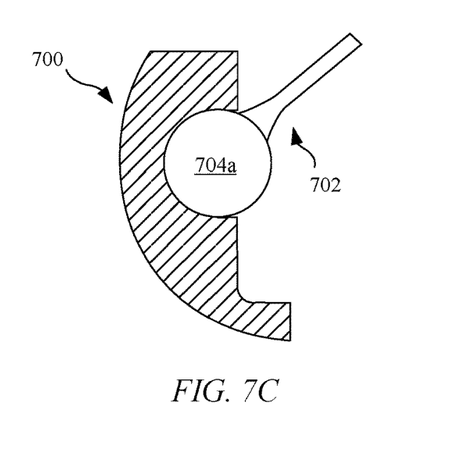
Figure 7D:
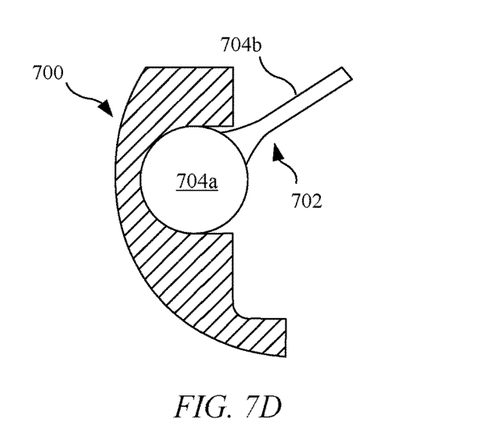
Figure 7E:
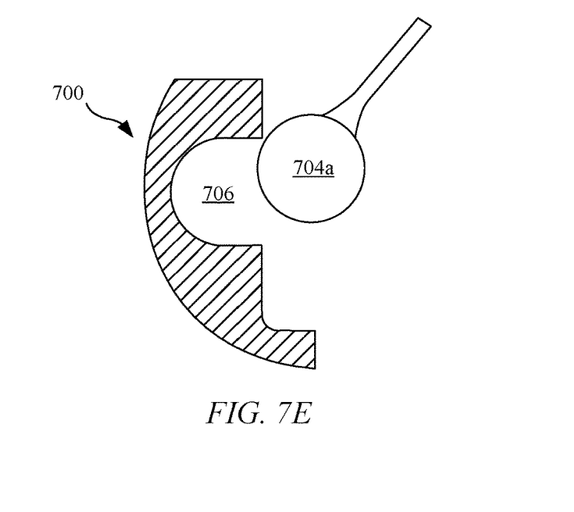

FIGS. 7A-7E show yet another method for forming a recess in a wall of a housing 700. FIG. 7A shows a cross-sectional side view of housing 700. FIG. 7B shows ball cutter 702 which includes a cutting portion 704a and a holding portion 704b. Cutting portion 704a can be used to engage an inside surface of housing 700. FIGS. 7C-7D show how cutting portion 704a of ball cutter 702 can gradually cut through the inside surface of housing 700. It should be noted that, as depicted in FIG. 7D, as ball cutter 702 cuts deeper into housing 700 holding portion 704b can be rotated down to avoid contact between holding portion 704b and housing 700. In this way, the holding portion 704b can remain clear of any other obstructions, such as interior sidewalls at the beginning of a cutting operation and then be maneuvered during the cutting operation to stay clear of housing 700. FIG. 7E shows a geometry of recess 706 after ball cutter 702 is removed subsequent to the cutting operation. It should also be noted that housing 700 is depicted having a curved exterior surface that increases a thickness of the sidewall in a position that helps thicken the sidewall where a greatest amount of material is removed for recess 706. Similarly, it should be understood that while other housings have shown flat exterior surfaces an exterior curvature of the sidewalls can be shaped to accommodate other recess geometries.

Figure 7F:
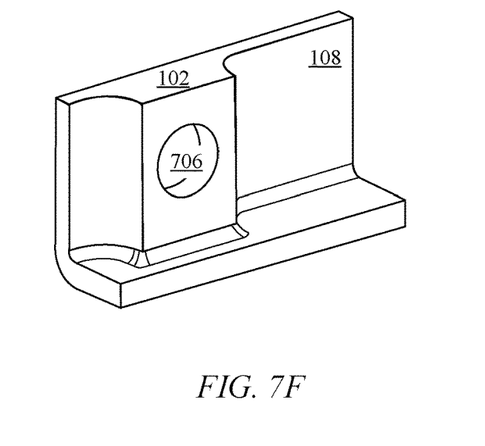
FIGS. 7F-7J show how a threaded insert can be engaged within a recess formed in accordance with the machining operation depicted in FIGS. 7A-7E.
Figure 7G:
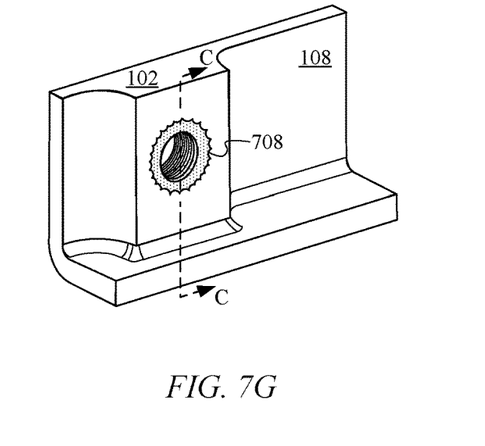
Figure 7H:
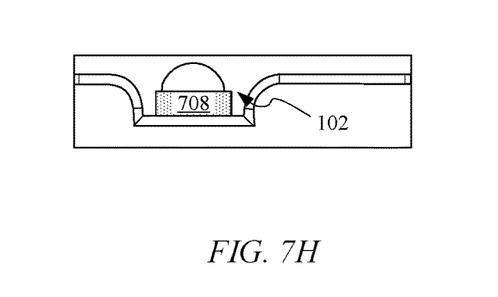
Figure 7I:
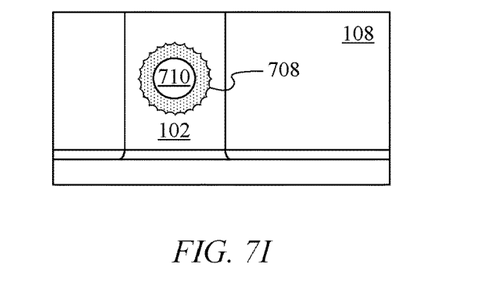

FIGS. 7F-7J show how a threaded insert can be engaged within recess 706. FIG. 7F shows a perspective view of recess 706 formed in a wall 108 of a housing in accordance with the machining operation depicted in FIGS. 7A-7E. FIG. 7G shows how threaded insert 708 can be positioned when inserted into recess 706. Threaded insert 708 can have a geometry in accordance with a circular geometry of recess 706 so that it fills at least a front portion of recess 706, as depicted in FIG. 7H. Also as depicted, threaded insert 708 is pressed into recess 706 until a front surface of threaded insert 708 is substantially flush with a front surface of protrusion 102. In some embodiments, threaded insert 708 can be designed to fill substantially all of recess 706. Threaded insert 708 also includes a threaded opening 710, as depicted in FIG. 7I. Threaded opening 710 can be configured to receive a threaded fastener in a way that mechanically couples the threaded fastener to threaded insert 708.

Figure 7J:
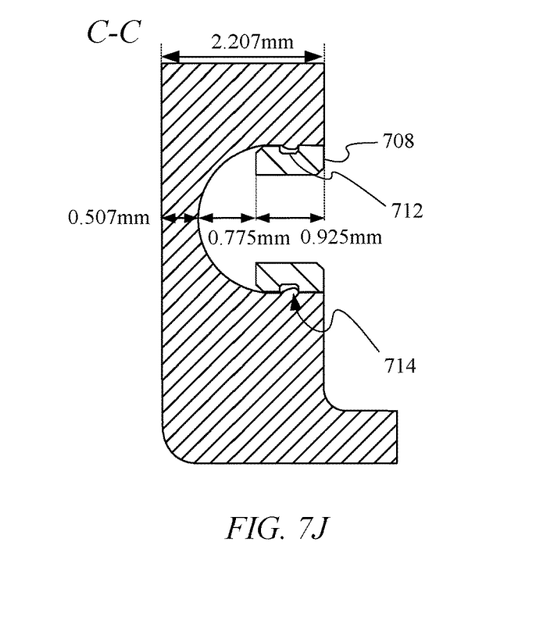

FIG. 7J shows an amount of clearance between threaded insert 708 and a back end of recess 706. FIG. 7J also depicts how an annular channel 712 in threaded insert 708 causes material 714 from the housing to be trapped within annular channel 712 as threaded insert 708 is pressed into recess 706. In this way, the material 714 of the housing that deforms into annular channel 712 effectively prevents removal of threaded insert 708 from recess 706. It should be noted that while FIG. 7J shows specific dimensions of wall 108 and recess 706, the dimensions should not be construed as limiting. For example, the thickness of material between recess 706 and an outside surface of wall 108 is depicted as about 0.5 mm, but can be greater or smaller depending upon a material used to form wall 108. For example, if 0.5 mm were appropriate for a wall formed from aluminum or aluminum alloy, 0.25 mm may be sufficient for a stainless steel housing.

It should be understood that while many threaded insert configurations have been described, many of the features described with regards to any one of the described threaded inserts can be equally well applied to other ones of the threaded inserts. Furthermore, in some embodiments, the threaded insert itself can be a composite insert formed from multiple materials. For example, a plastic core can support metal threading and a metal periphery so that the threaded insert can be lighter but still configured to deforms the recess and be securely coupled with a threaded fastener.

Figure 8:
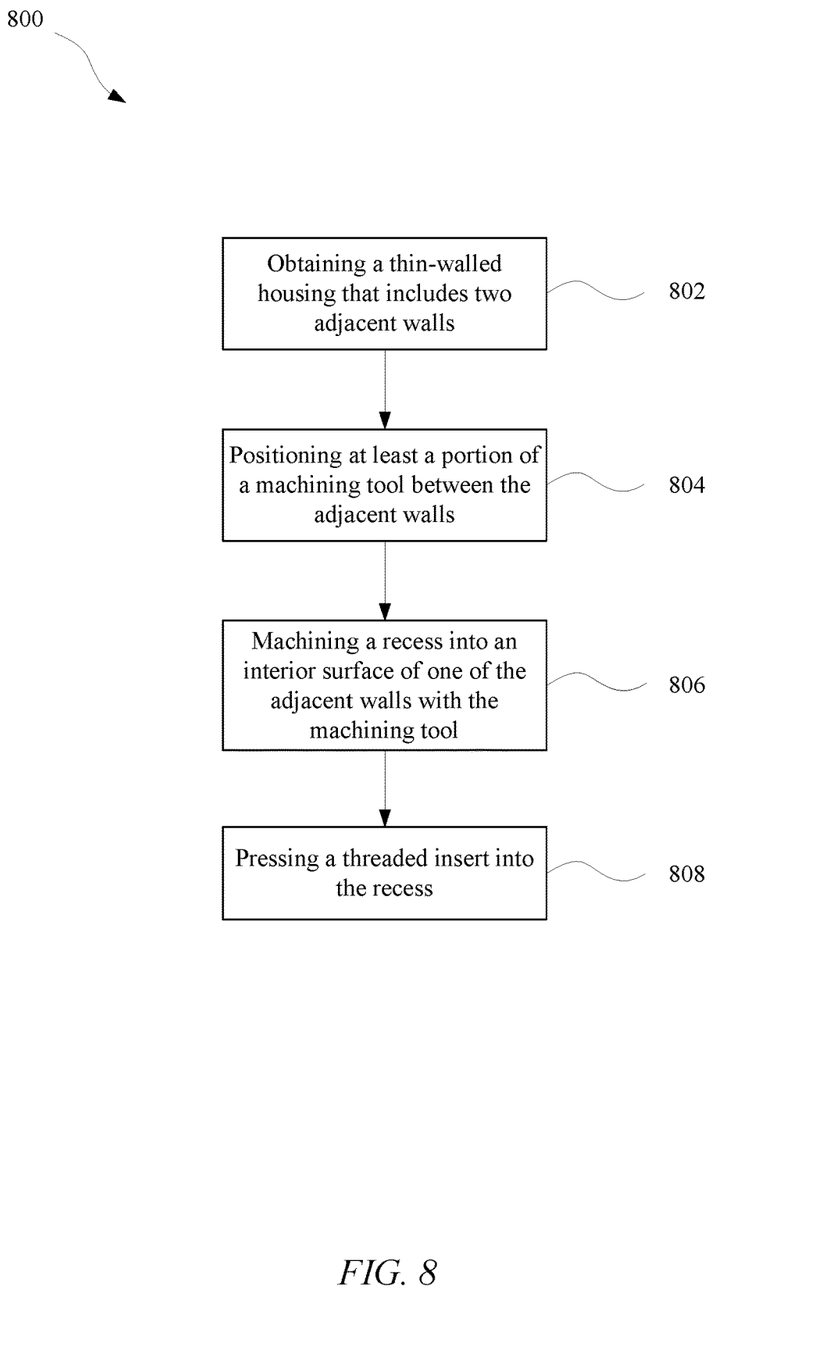
FIG. 8 shows a flow chart representing a method for forming an attachment point by embedding a threaded insert in a recess of a thin-walled housing

FIG. 8 shows a flow chart representing a method for forming an attachment point by embedding a threaded insert in a recess of a thin-walled housing. In a first step 802 a thin-walled housing that includes at least two adjacent walls is obtained. A thickness of the walls can be varied to provide increased wall thicknesses only at select locations that require additional thickness to allow for retaining a threaded insert. At step 804 at least a cutting portion of a machining tool is positioned between the adjacent walls and near a protrusion formed resulting from the varied wall thicknesses. At step 806 the cutting portion of the machining tool engages at least one protrusion resulting from the varied wall thicknesses. Engagement of the protrusion by the cutting portion during a cutting operation forms a recess having a size and shape in accordance with a threaded insert. The cutting operation can include a number of discrete cutting operations or can be formed during a single cutting operation in which the machining tool is maneuvered in three dimensional space.

At step 808, subsequent to forming the recess, a threaded insert is pressed into the recess. The threaded insert can be formed of a material that is either harder of softer than the surfaces defining the recess so that one of the threaded insert of the surfaces defining the recess can deform during the insertion operation. Deformation can result in the threaded insert being embedded within the recess. For example, a series of protruding features arranged along a periphery of the threaded insert can dig into the surfaces defining the recess so that anti-rotational grooves are established that resist rotation of the threaded insert within the recess. In some cases, the protruding features can define an annular groove that allows material to collect between a leading and trailing portion of each of the protruding features. In this way, pull out of the recess is made even more unlikely. Alternatively, a number of openings can be machined into the protrusion in addition to the recess for accommodating shafts or retaining members that interact with a portion of the threaded insert to keep the threaded insert from becoming dislodged from the recess. In one particular embodiment, the shafts can extend across the recess and in front of a lateral portion of the inserted threaded insert. In this way, the threaded insert can be replaced by removing the shafts from the openings. In other embodiments, a combination of retaining features and protruding features can be utilized to secure the threaded insert within the recess.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. An electronic device, comprising:
a housing comprising:
a wall that includes a first groove and a second groove, the first groove intersecting with the second groove to form an X-shaped recess, the first groove and the second groove each comprising a concave surface that defines the X-shaped recess;
a threaded insert positioned within the X-shaped recess and having a surface that is flush with the wall; and
a threaded fastener in threaded engagement with the threaded insert and securing an internal component against the wall.

2. The electronic device as recited in claim 1, wherein the first groove is arranged approximately perpendicular to the second groove.

3. The electronic device as recited in claim 1, wherein the threaded insert has a size and shape such that the threaded insert is retained in the X-shaped recess with an interference fit.

4. The electronic device as recited in claim 1, wherein the wall comprises a protrusion, the protrusion comprising the first groove and the second groove.

5. The electronic device as recited in claim 4, wherein the threaded insert is formed from a material that is substantially harder than a material of the protrusion.

6. The electronic device as recited in claim 1, wherein the threaded insert comprises engaging features that deform portion of a surface defining the first groove and the second groove so that the threaded insert is secured within the first groove and the second groove.

7. The electronic device as recited in claim 1, wherein the threaded insert comprises stainless steel, and wherein the wall comprises aluminum.

8. An attachment feature for an electronic device, the attachment feature comprising:
a sidewall comprising a protrusion that includes an X-shaped recess; and
a threaded insert having a size and shape in accordance with the X-shaped recess, the threaded insert comprising a front face, wherein the threaded inserts fills the X-shaped recess such that the front face is flush with respect to a surface of the sidewall, and wherein threading of the threaded insert is oriented along an axis that is substantially normal to a front surface of the protrusion.

9. The attachment feature of claim 8, wherein a wall is disposed proximate the sidewall and wherein the sidewall cooperates with the wall to define a channel that the protrusion extends into.

10. The attachment feature of claim 8, wherein a material forming the protrusion is softer than a material that forms the threaded insert.

* * * * *